United States Patent
Akman et al.

(10) Patent No.: US 10,802,579 B2
(45) Date of Patent: Oct. 13, 2020

(54) ARTIFICIAL REALITY SYSTEM HAVING MULTIPLE MODES OF ENGAGEMENT

(71) Applicant: Facebook Technologies, LLC, Menlo Park, CA (US)

(72) Inventors: Oytun Akman, Kensington, CA (US); Ioannis Pavlidis, Newark, CA (US); Ananth Ranganathan, Santa Clara, CA (US); Meghana Reddy Guduru, Redwood City, CA (US); Jeffrey Witthuhn, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/264,812

(22) Filed: Feb. 1, 2019

(65) Prior Publication Data

US 2020/0249749 A1 Aug. 6, 2020

(51) Int. Cl.
*G06F 3/01* (2006.01)
*G06T 7/73* (2017.01)
*G06T 17/05* (2011.01)

(52) U.S. Cl.
CPC .............. *G06F 3/012* (2013.01); *G06T 7/74* (2017.01); *G06T 17/05* (2013.01)

(58) Field of Classification Search
CPC ............ G06F 3/012; G06T 7/74; G06T 17/05
See application file for complete search history.

(56) References Cited

U.S. PATENT DOCUMENTS

| | | | |
|---|---|---|---|
| 2015/0279081 A1 | 10/2015 | Monk et al. | |
| 2016/0005229 A1* | 1/2016 | Lee | G06F 3/0488 345/419 |
| 2016/0093108 A1 | 3/2016 | Mao et al. | |
| 2018/0164877 A1 | 6/2018 | Miller et al. | |
| 2018/0285052 A1* | 10/2018 | Eade | G06F 3/04815 |
| 2019/0073831 A1* | 3/2019 | Kim | G03H 1/0005 |
| 2019/0188918 A1* | 6/2019 | Brewer | G06F 3/011 |

OTHER PUBLICATIONS

Hamilton, Ian "OC5: Impressive Oculus Quest Arena-Scale Dead And Buried Tech Demo" Sep. 27, 2018, available at https://uploadvr.com/oc5-oculus-quest-arena-tech/ (last accessed May 22, 2019), 4 pp.
"SwiftShot: Creating a Game for Augmented Reality" Apple Developer, available at https://developerapple.com/documentation/arkit/swiftshot_creating_a_game_for_augmented_reality (last accessed Jun. 11, 2020), Jan. 19, 2019, 4 pp.
International Search Report and Written Opinion dated May 19, 2020 received in counterpart International Application No. PCT/US2020/015901, 16 pp.

* cited by examiner

*Primary Examiner* — Haixia Du
(74) *Attorney, Agent, or Firm* — Shumaker & Sieffert, P.A.

(57) ABSTRACT

In general, this disclosure describes an artificial reality system that provides asymmetric user experiences to users associated with user devices that operate according to different modes of engagement with the artificial reality system. Different user devices may have different capabilities, be used by users having different roles for an artificial reality application, or otherwise be configured to interact in a variety of ways with an artificial reality system.

19 Claims, 8 Drawing Sheets

ARTIFICIAL REALITY SYSTEM HAVING MULTIPLE MODES OF ENGAGEMENT

TECHNICAL FIELD

This disclosure generally relates to artificial reality systems, such as virtual reality, mixed reality and/or augmented reality systems, and more particularly, to multi-user artificial reality applications.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems use one or more devices for interacting with the system and rendering and displaying content to one or more users. As one example, an artificial reality system may incorporate a head-mounted display (HMD) worn by a user and configured to output artificial reality content to the user. As another example, an artificial reality system may output content for display by a tablet computer, mobile phone, or other device having a non-HMD form factor. The artificial reality content may include completely-generated content or generated content combined with captured content (e.g., real-world video and/or images).

SUMMARY

In general, this disclosure describes an artificial reality system that provides asymmetric user experiences to users associated with user devices that operate according to different modes of engagement with the artificial reality system. Different user devices may have different capabilities, be used by users having different roles for an artificial reality application, or otherwise be configured to interact in a variety of ways with an artificial reality system.

In some examples, the respective modes of engagement for the various user devices are determined, at least in part, based on capabilities and resources of the particular devices. For example, a head-mounted display (HMD) or other device having inside-out tracking may fully engage with the artificial reality system to provide tracking information, display artificial reality content, compute a local pose of the HMD, contribute mapping information for mapping a physical three-dimensional (3D) environment, and contribute event data (e.g., user inputs or information relating to a location of a user) for an artificial reality application. However, other user devices, such as a tablet computer, may have more limited or otherwise different input/output capabilities or have no or limited tracking ability, or another computer device may be associated with a user that has a restricted role that prevents the user from contributing event data to the artificial reality system (e.g., from playing a virtual reality game). Such user devices, operating according to a more limited mode of engagement with the artificial reality system, may nevertheless still present artificial reality content to users. In other examples, the respective modes of engagement for the various user devices are determined and dynamically controlled, at least in part, based on user preferences or other criteria, such as operating conditions for each user device, as monitored or otherwise determined by the artificial reality system.

The various user devices that engage the artificial reality system may contribute mapping information to collaboratively map the physical 3D environment in which the user devices are operating. For example, multiple HMDs may provide mapping information, such as images and tracking information, to enable the artificial reality system to identify mapping points for the physical 3D environment and build a topography map using information from multiple different devices. The user devices may contribute such mapping information according to their respective modes of engagement. For instance, a tablet computer having only a camera and limited resources may be unable to contribute tracking information but may still be able to contribute mapping information including images that are usable by the physical 3D environment to build the topography map. A mode of engagement for a user device may also determine the method by which the artificial reality system computes a local pose for the user device. For instance, an artificial reality system may compute a local pose for an HMD using tracking information for the HMD, but a tablet computer may compute a local pose for the tablet computer using an image captured at the local pose and compared to a topography map for the physical 3D environment that has been downloaded to the tablet computer.

Accordingly, the techniques of the disclosure provide specific technical improvements to the computer-related field of artificial reality systems. For example, an artificial reality system as described herein may provide asymmetric user experiences to users associated with user devices that operate according to different modes of engagement with the artificial reality system. At least in some cases, the artificial reality system generates artificial reality content by computing local poses for user devices in an asymmetric manner according to the modes of engagement for the user devices, where such modes may vary based on the capabilities of the user devices. Still further, the artificial reality system described herein may enable collaborative generation of a topography map for a physical 3D environment as well as distribution of the topography map to the more limited class of user devices to enable image-based tracking for such user devices. The artificial reality system may in this way be engaged by a more limited class of user devices, e.g., non-HMDs such as mobile phones or tablet computers, according to modes of engagement that still provides users of such user devices with access to the artificial reality content and/or allows such user devices to contribute mapping information to the artificial reality system, while preventing the more limited class of user devices from engaging the artificial reality system in other ways.

In one example, this disclosure describes an artificial reality system comprising a plurality of user devices concurrently operating within a physical three-dimensional (3D) environment, wherein each of the user devices operates according to one or more of a plurality of modes of engagement within the artificial reality system, and wherein a first set of the user devices operating according to a first mode of the modes of engagement contribute event data for an artificial reality application and a second set of the user devices operating according to a second mode of the modes of engagement contribute mapping information for the 3D environment; one or more pose trackers configured to compute respective poses for each of the user devices concurrently operating within the 3D environment; a mapping engine configured to generate, using the mapping information, a master three-dimensional (3D) map of the physical 3D environment in which the user devices are located; and one or more rendering engines configured to render, based at least on one or more of the computed poses, artificial reality content corresponding to the master 3D map, the artificial reality content for display by one or more of the user devices.

In another example, this disclosure describes a method comprising computing, by an artificial reality system, respective poses for each of a plurality of user devices concurrently operating within a physical three-dimensional (3D) environment, wherein each of the user devices operates according to one or more of a plurality of modes of engagement within the artificial reality system; receiving, from a first set of the user devices operating according to a first mode of the modes of engagement, event data for an artificial reality application; generating, using mapping information received from a second set of the user devices operating according to a second mode of the modes of engagement, a master three-dimensional (3D) map of the physical 3D environment in which the user devices are located; and rendering, based at least on one or more of the computed poses and the event data for the artificial reality application, artificial reality content corresponding to the master 3D map, the artificial reality content for display by one or more of the user devices.

In another example, this disclosure describes a non-transitory computer-readable medium comprising instructions for causing one or more processors of an artificial reality system to perform operations comprising computing respective poses for each of a plurality of user devices concurrently operating within a physical three-dimensional (3D) environment, wherein each of the user devices operates according to one or more of a plurality of modes of engagement within the artificial reality system; receiving, from a first set of the user devices operating according to a first mode of the modes of engagement, event data for an artificial reality application; generating, using mapping information received from a second set of the user devices operating according to a second mode of the modes of engagement, a master three-dimensional (3D) map of the physical 3D environment in which the user devices are located; and rendering, based at least on one or more of the computed poses and the event data for the artificial reality application, artificial reality content corresponding to the master 3D map, the artificial reality content for display by one or more of the user devices.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
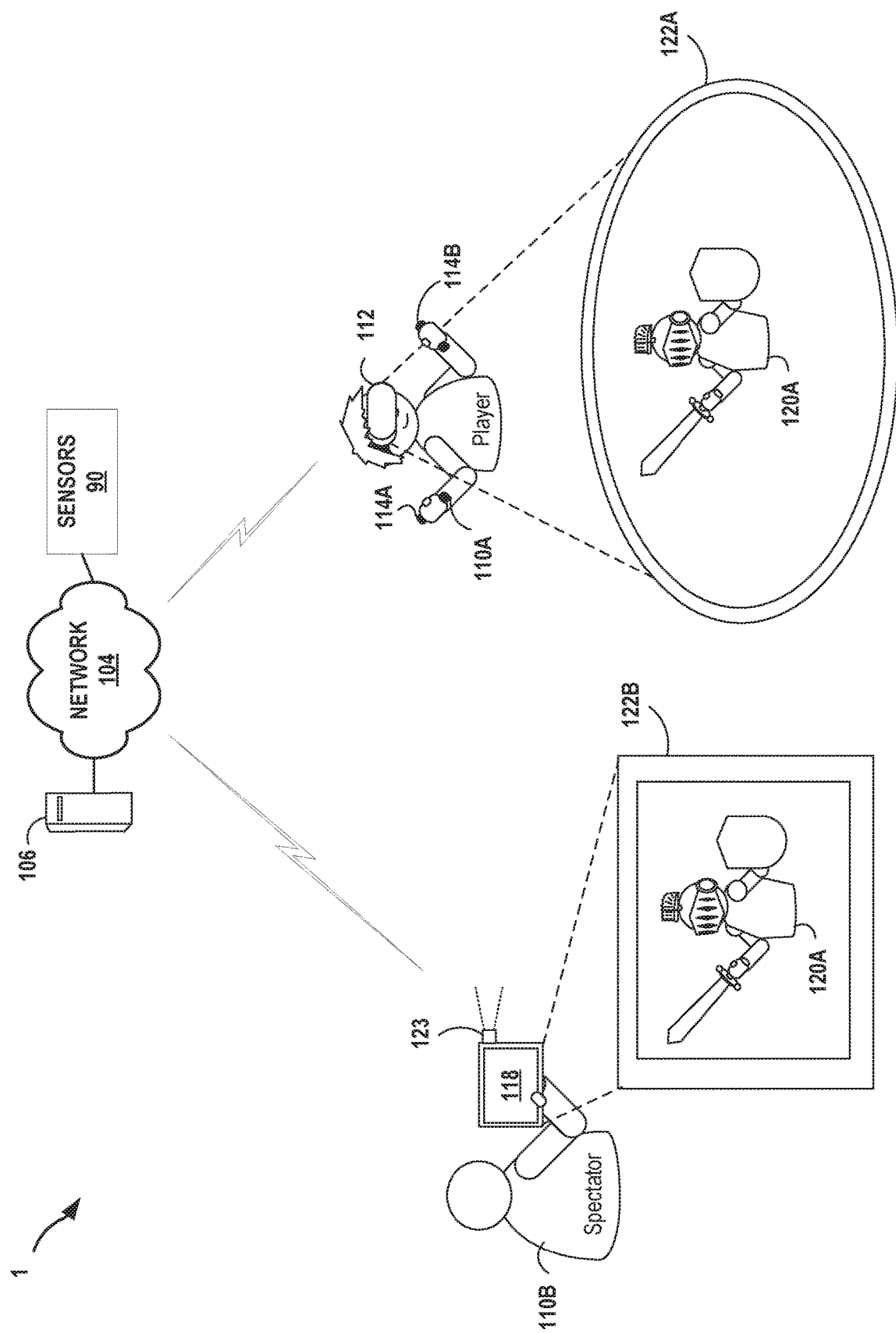
FIG. 1A is an illustration depicting an example artificial reality system that provides asymmetric user experiences to users associated with respective user devices that operate according to different modes of engagement with the artificial reality system, in accordance with the techniques of the disclosure.

FIG. 1A is an illustration depicting an example artificial reality system 1 that provides asymmetric user experiences to users associated with respective user devices that operate according to different modes of engagement with the artificial reality system 1, in accordance with the techniques of the disclosure.

In the example of FIG. 1A, artificial reality system 1 includes head-mounted display (HMD) 112, controllers 114A-114B (collectively, "controllers 114") for HMD 112, console 106, user device 118, and, in some examples, one or more sensors 90. As shown, HMD 112 is typically worn by user 110A and includes an electronic display and optical assembly for presenting artificial reality content 122A having images 120A to the user. In addition, HMD 112 includes one or more sensors (e.g., accelerometers) for tracking motion of the HMD and may include one or more image capture devices, e.g., cameras, line scanners and the like, for capturing image data of the surrounding environment. Each controller 114 is an input device which user 110A may use to provide input to console 106, HMD 112, or another component of artificial reality system 1.

In general, artificial reality system 1 uses information obtained from a real-world or physical three-dimensional (3D) environment to render artificial reality content 122A-122B for display by HMD 112 and user device 118, respectively, to users 110A-110B. In the example of FIG. 1A, user 110A views the artificial reality content 122A constructed and rendered by an artificial reality application executing on console 106 and/or HMD 112, while user 110B views the artificial reality content 122B constructed and rendered by an artificial reality application executing on console 106 and/or user device 118. As one example, artificial reality content 122 may be a consumer gaming application in which user 110A is rendered as avatar 120A with, in some examples, as a mixture of real-world imagery and virtual objects, e.g., mixed reality and/or augmented reality. In other examples, artificial reality content 122A-122B may correspond to, e.g., a video conferencing application, a navigation application, an educational application, training or simulation applications, augmented reality application, virtual reality application, or other type of applications that implement artificial reality. As used in this disclosure, the phrase "A and/or B" may refer to A only, B only, or both A and B.

User device 118 may represent a laptop computer, mobile phone, personal digital assistant, tablet computer, HMD, smart goggles/glasses, or other user device having a display by which user device 118 displays artificial reality content 122B to user 110B. User device 118 may have more limited input/output, tracking, or user interface device capabilities than HMD 112. For example, user device 118 may not enable tracking by sensors 90, may be unable to display artificial reality content 122B using a 3D display device, may have a more limited image capture device 123 or no image capture device 123, or may have no accelerometers, global positioning system (GPS) sensors, or other devices by which the user device 118 may track a location or local pose within the physical 3D environment. User device 118 may not enable user inputs that result in event data for an artificial reality application executed by artificial reality system 1. User device 118 may not contribute tracking information, mapping information for the physical 3D environment, and/or event data for the artificial reality application. In some examples, user device 118 has similar input/output, tracking, or user interface capabilities as HMD 112 but is not configured to use the capabilities in conjunction with other components of artificial reality system 1. In the example of FIG. 1A, user device 118 has an image capture device 123, such as a camera, which generates images of the physical 3D environment.

Both user device 118 and HMD 112 are user devices in that the devices are computing devices used by a user to interact with other components of artificial reality system 1. Artificial reality system 1 may, in other examples, include a set of one or more instances of HMDs 112 all operating concurrently within the physical 3D environment along with a set of one or more instances of user devices 118 also operating concurrently within the physical 3D environment.

In the example of FIG. 1A, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, controllers 114, user device 118, and sensors 90 may, as shown in this example, be communicatively coupled via network 104, which may be a wired or wireless network, such as Wi-Fi, a mesh network or a short-range wireless communication medium. Controllers 114 may be in communication with HMD 112 using near-field communication or short-range wireless communication such as Bluetooth, using wired communication links, or using another type of communication links. Although HMD 112 is shown in this example as in communication with, e.g., tethered to or in wireless communication with, console 106, in some implementations HMD 112 operates as a stand-alone, mobile artificial reality system. As such, some or all functionality attributed to console 106 in this disclosure may be distributed among one or more user devices, such as one or more instances of HMD 112 and user device 118.

In accordance with techniques described in this disclosure, artificial reality system 1 enables multiple different modes of engagement for user devices to facilitate different types of interaction by the user devices within artificial reality system 1. Each mode of engagement may be configured within the artificial reality system 1 and may specify one or more permissible types of interaction by a user device with the artificial reality system 1. A mode of engagement for a user device may be based in part on a role of user 110 associated with the user device, characteristics of the user device including interface devices thereof, a configuration of the user device for an artificial reality application, a location of the user device within a physical 3D environment, a version of the artificial reality application executed by the user device, and/or the time and date in which the user device is operating, for example.

In the example of FIG. 1A, user 110A may be a "player" or "participant" in the artificial reality application and HMD 112 associated with the player user 110A therefore operates according to a first mode of engagement, which permits one or more types of interactions by the HMD 112 within the artificial reality system 1. For example, HMD 112 operating according to the first mode of engagement may receive artificial reality content for display and contribute event data that affects a state of the artificial reality application. As another example, HMD 112 operating according to the first mode of engagement may send indications of user inputs received by controllers 114 to console 106 to cause the console 106 to alter a state of objects within the artificial reality application, e.g., moving an avatar, moving a virtual object, engaging a virtual object such as using a tool or virtual device within the artificial reality, and so forth. As another example, artificial reality system 1 may track HMD 112 operating according to the first mode of engagement using tracking information from sensors 90 and/or HMD 112 to determine poses of the HMD 112 within the physical 3D environment. As another example, HMD 112 operating according to the first mode of engagement may generate and upload mapping information to console 106, where console 106 can use the mapping information to generate a master 3D map of the physical 3D environment. In general, a map of any area within the physical 3D environment specifies locations of objects, e.g., using map points identified in images that denote the geometry of a scene and can be used to generate a topography of the area. Mapping information may include images or video captured by a camera and tracking information, such as user device coordinates or motion vectors, for instance. Mapping information may include 3D point clouds; polygon, triangle, or other type of mesh models; elevation models; topographic maps; volumetric distance fields; surface models such as non-uniform rational basis spline surface models; depth maps; and so forth. Tracking information may also include internal user device sensor data, external sensor data from sensors 90, IMU data, images from external cameras, sensor data from other tracking devices, or other information useful for computing a local pose for a user device.

Further in the example of FIG. 1A, user 110B may be "spectator" or "observer" in the artificial reality application and user device 118 associated with the spectator user 110B therefore operates according to a second mode of engagement, which permits one or more types of interactions by the user device 118 within the artificial reality system 1, which may be more limited than the types of interactions permitted by the first mode of engagement for HMD 112 associated with the player user 110A. For example, user device 118 operating according to the second mode of engagement may receive artificial reality content for display but may not contribute event data that affects a state of the artificial reality application. As another example, user device 118 may contribute mapping information but not receive artificial reality content for display. User device 118 may be unable to contribute tracking information and/or artificial reality system 1 may not generate tracking information for user device 118.

The mode of engagement for a user device may also determine the method by which the artificial reality system 1 computes a local pose for the user device. For instance, artificial reality system 1 may compute a local pose for HMD 112 using tracking information for the HMD 112, but user device 118 may compute a local pose for the user device 118 using an image captured at the local pose by image capture device 123 and compared to a topography map for the physical 3D environment that has been downloaded to user device 118. In this way, user device 118, which operates according to a second mode of engagement more limited than the first mode of engagement for HMD 112, may still be localized within the physical 3D environment by computing the local pose. Furthermore, artificial reality system 1 may generate artificial reality content 122A not only for the HMD 112 but also generate artificial reality content 122B for the user device 118 according to the local pose computed for user device 118 and corresponding to a map of the physical 3D environment. In this example, the artificial reality content 122B is the avatar 120A of user 110A, where the avatar 120A may be in the artificial 3D environment mapped to user 110A located in the physical 3D environment 122, and where the avatar 120A is presented for display to user 110B in the artificial 3D environment based on a current view perspective of a frame of reference, i.e., at the computed local pose for user device 118.

Users 110A-110B may be concurrently using the artificial reality system 1 such that HMD 112 and user device 118 concurrently operate according to their respective modes of engagement within the artificial reality system 1. As a result, the artificial reality system 1 may include computing infrastructure that enables asymmetric user experiences to users 110 associated with user devices that operate according to different modes of engagement with the artificial reality system. At least in some cases, moreover, artificial reality system 1 generates artificial reality content by computing local poses for user devices differently according to the modes of engagement for the user devices, where such modes may vary based on the capabilities of the user devices. Artificial reality system 1 may in this way be engaged by a more limited class of user devices, e.g., non-HMDs such as mobile phones or tablet computers, according to modes of engagement that still provides users of such user devices, such as user 110B, with access to the artificial reality content and/or allows such user devices to contribute mapping information to the artificial reality system, while preventing more limited classes of user devices from interacting with artificial reality system 1 in other ways.

Figure 1B:
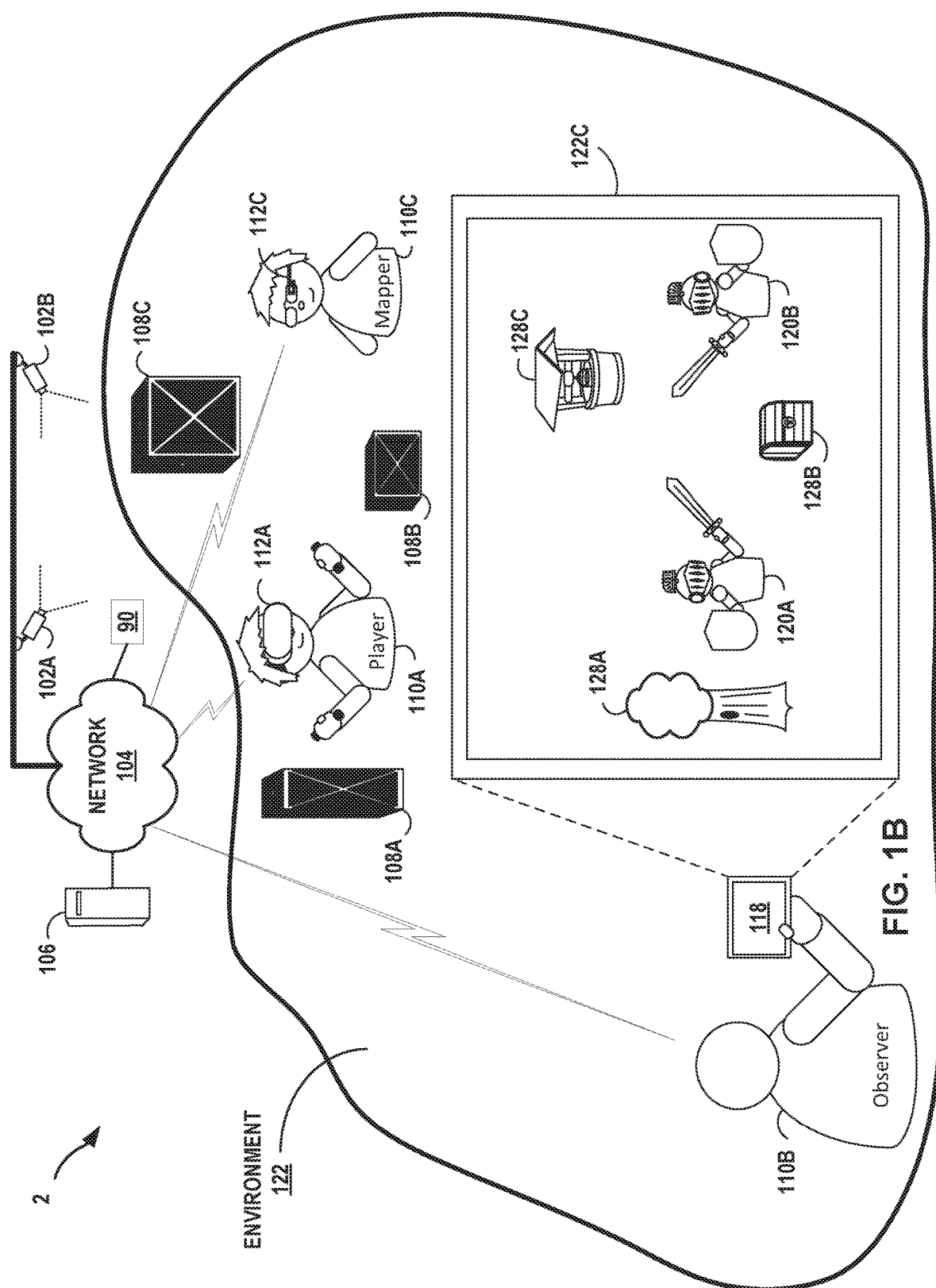
FIG. 1B is an illustration depicting another example artificial reality system 2 that provides asymmetric user experiences to users 110A-110C associated with respective user devices that operate according to different modes of engagement with the artificial reality system 2, in accordance with the techniques of the disclosure.

FIG. 1B is an illustration depicting another example artificial reality system 2 that provides asymmetric user experiences to users 110A-110C associated with respective user devices that operate according to different modes of engagement with the artificial reality system 2, in accordance with the techniques of the disclosure. In this example, artificial reality system 2 includes cameras 102A and 102B (collectively, "cameras 102"), HMDs 112A and 112C (collectively, "HMDs 112"), console 106, sensors 90, and user device 118. HMD 112C may be similar to HMD 112A.

As shown in FIG. 1B, artificial reality system 2 provides a multi-user artificial reality application executing on console 106, HMDs 112 and/or user device 118 to present artificial reality content to each user based on a current viewing perspective of a corresponding frame of reference for that user. That is, in this example, the artificial reality application constructs artificial content by tracking and computing pose information for a frame of reference for each of HMDs 112 and user device 118. Artificial reality system 2 uses data received from cameras 102, HMDs 112, controllers 114, and user device 118 to capture 3D information within the real-word, physical 3D environment 122, such as motion by users 110 and/or tracking information with respect to users 110 and objects 108, for use in computing updated pose information for a corresponding frame of reference of HMDs 112 or user device 118. As one example, the artificial reality application may render, based on a current viewing perspective determined for user device 118, artificial reality content 122 having content objects 128A-128C as spatially overlaid upon real world objects 108A-108C (collectively, "objects 108"). Further, from the perspective of user device 118, artificial reality system 2 renders avatars 120A, 120B based upon the estimated positions and poses for users 110A, 110C, respectively.

In accordance with techniques described in this disclosure, each of HMD 112 and user device 118 concurrently operates according to a different mode of engagement within artificial reality system 2. HMD 112A and user device 118 may operate similarly to HMD 112 and user device 118 of FIG. 1A. HMD 112C may operate according to a mode of engagement in which the HMD 112C generates and sends, via network 104, mapping information to console 106. HMD 112A may also generate and send, via network 104, mapping information to console 106. The mapping information may include images (such as still images or video), generated by the HMDs 112A, 112C, that depict objects located within physical 3D environment 122. Objects may include physical objects within environment 122, whether static or dynamic, such as buildings (including walls, floors, ceilings, stairs, rooms), artificial reality application participants (such as humans, robots, or other agents), objects 108A-108C, controllers 114 held by the participants, vehicles, and so forth. Mapping information may also be or include tracking information usable by the artificial reality system 2 to localize a user device, controllers, and/or an associated user. Console 106 may use the mapping information to generate a master 3D map that represents the topography for environment 122. For example, console 106 can identify map points for images of objects within the mapping information. Map points can include object corners, edges, and so forth that reflect the geometry of a topography of an environment. As HMDs 112A, 112C move about the physical 3D environment 122, the HMDs 112A, 112C generate additional images of different objects within different areas of the environment 122 and send the additional mapping information to console 106. Console 106 may use the additional mapping information to generate an updated master 3D map that represents a more complete topography for environment 122. HMDs 112A, 112C may operate concurrently, and the HMDs 112A, 112C may generate images of different areas, overlapping areas, or the same area of physical 3D environment 122 when engaging within artificial reality system 2 according to their respective modes of engagement. In this way, artificial reality system 2 facilitates collaborative generation of a master 3D map for the physical 3D environment 122.

Figure 2:
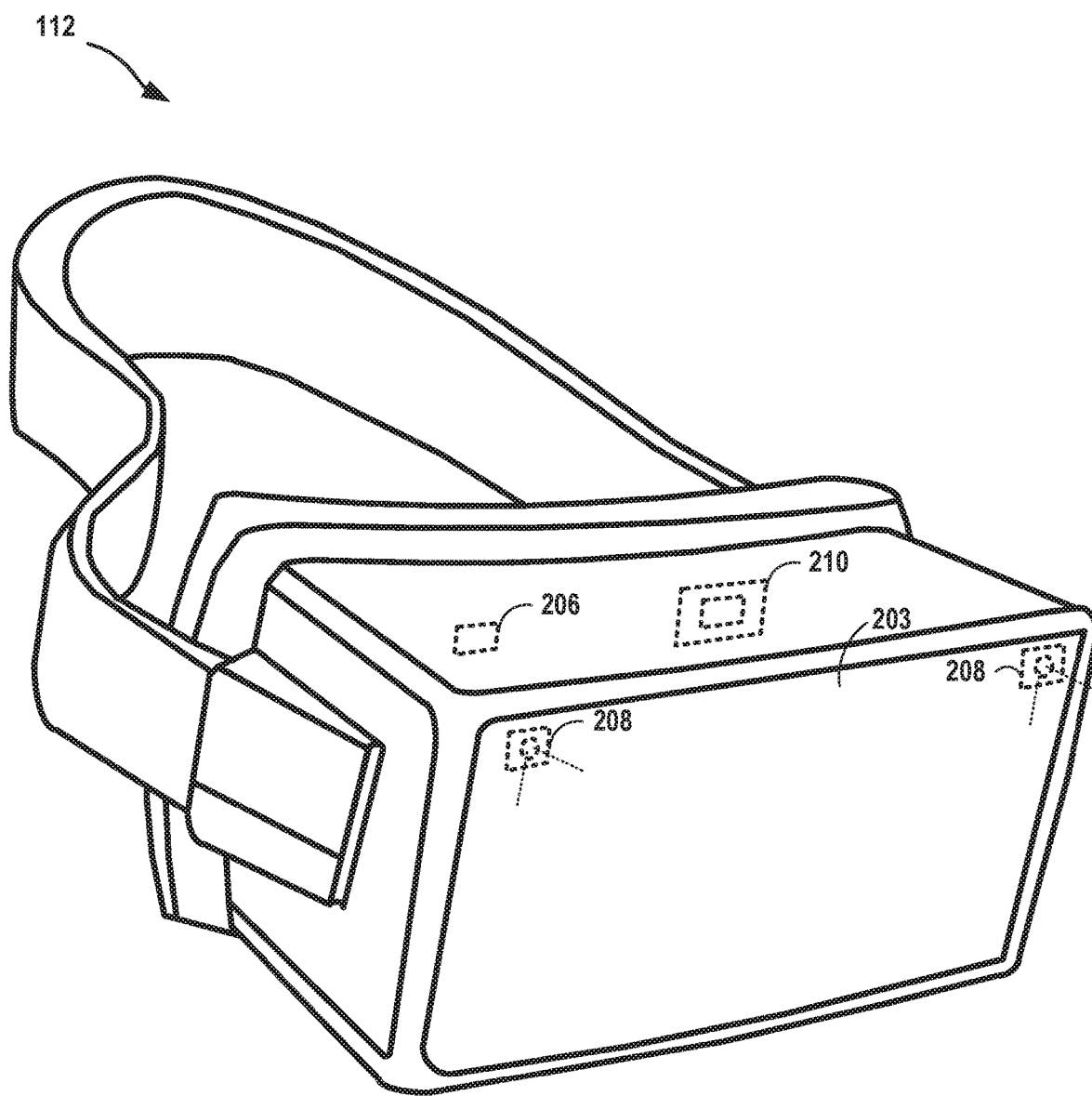
FIG. 2 is an illustration depicting an example HMD configured to operate in accordance with the techniques of the disclosure.

FIG. 2 is an illustration depicting an example HMD 112 configured to operate in accordance with the techniques of the disclosure. HMD 112 of FIG. 2 may be an example of any of HMDs 112 of FIGS. 1A and 1B. HMD 112 may be part of an artificial reality system, such as artificial reality systems 1, 2 of FIGS. 1A, 1B, or may operate as a stand-alone, mobile artificial realty system configured to implement the techniques described herein. HMD 112 may include a mobile device (e.g., a smart phone) that is removable from the body of the HMD 112.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

As further shown in FIG. 2, in this example HMD 112 further includes one or more sensors 206, such as one or more accelerometers (also referred to as inertial measurement units or "IMUs") that output data indicative of current acceleration of HMD 112, GPS sensors that output data indicative of a location of HMD 112, radar or sonar sensors that output data indicative of distances of the HMD 112 from various objects, or other sensors that provide indications of a location or orientation of HMD 112 or other objects within a physical 3D environment. Moreover, HMD 112 may include one or more integrated image capture devices 208, such as a video camera, laser scanner, Doppler radar scanner, depth scanner, or the like, configured to output image data representative of a surrounding real-world environment. HMD 112 includes an internal control unit 210, which may include an internal power source and one or more printed-circuit boards having one or more processors, memory, and hardware to provide an operating environment for executing programmable operations to process sensed data and present artificial-reality content on display 203. Internal control unit 210 may be part of a removable computing device, such as a smart phone.

In accordance with the techniques described herein, control unit 201 is configured to operate according to a mode of engagement within an artificial reality system. For example, according to a mode engagement configured for HMD 112, the HMD 112 may compute, based on sensed data generated by motion sensors 206 and/or images generated by image capture devices 208, a current pose for a frame of reference of HMD 112. Control unit 201 may include a pose tracking unit, which can execute software for processing the sensed data and/or images to compute the current pose. Control unit 201 may store a master 3D map for a physical environment and compare processed images to the master 3D map to compute the current pose. Alternatively, or additionally, control unit 201 may compute the current pose based on sensor data generated by sensors 206. Based on the computed current pose, control unit 201 may render artificial reality content corresponding to the master 3D map for an artificial reality application, and control unit 201 may display the artificial reality content via the electronic display 203.

As another example, according to a mode of engagement configured for HMD 112, control unit 201 may generate mapping information for the physical 3D environment in which the HMD 112 is operating and send, to a console or one or more other computing devices (such as one or more other HMDs), via a wired or wireless communication session(s), the mapping information. In this way, HMD 112 may contribute mapping information for collaborate generation of the master 3D map for the physical 3D environment. Mapping information may include images generated by image capture device(s) 208, tracking information in the form of indications of the computed local poses, or tracking information that provide indications of a location or orientation of HMD 112 within a physical 3D environment (such as sensor data generated by sensors 206), for example.

In some examples, in accordance with the techniques described herein, control unit 201 may peer with one or more controllers for HMD 112 (controllers not shown in FIG. 2). Control unit 201 may receive sensor data from the controllers that provides indications of user inputs or controller orientations or locations within the physical 3D environment or relative to HMD 112. Control unit 201 may send representations of the sensor data to a console for processing by the artificial reality application, where the indications may be event data for an artificial reality application. Control unit 201 may execute the artificial reality application to process the sensor data.

Figure 3:
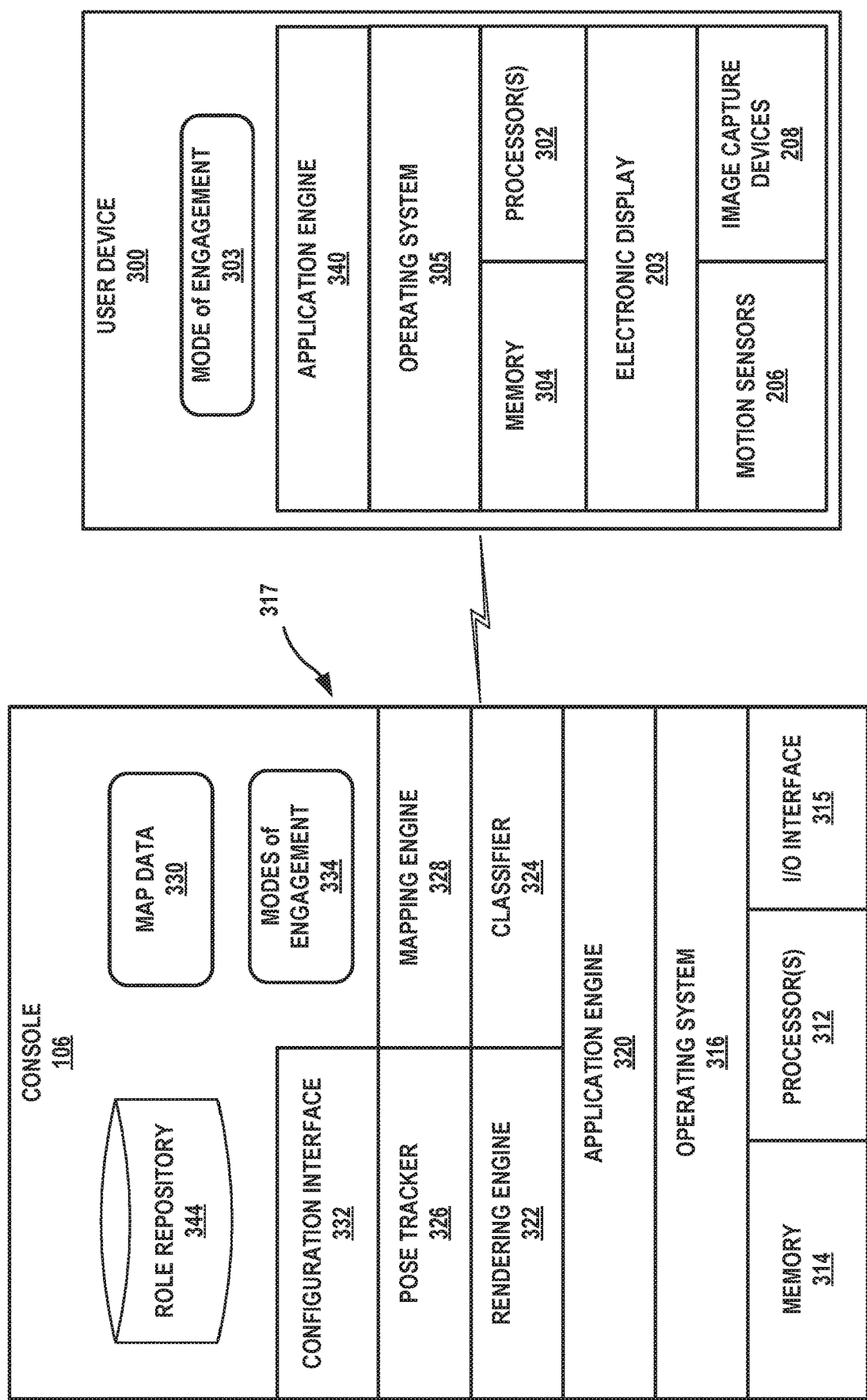
FIG. 3 is a block diagram showing example implementations of a console and a user device, such as any of the HMDs or a user device of FIG. 1A-1B, or 2.

FIG. 3 is a block diagram showing example implementations of console 106 and a user device, such as any of HMDs 112 or user device 118 of FIG. 1A-1B, or 2. In the example of FIG. 3, user device 300 operates according to one or more modes of engagement 304 within an artificial reality system implemented at least in part by console 106 and user device 300, in accordance with techniques described in this disclosure.

In this example, user device 300 includes one or more processors 302 and memory 304 that, in some examples, provide a computer platform for executing an operation system 305, which may be an embedded, real-time multitasking operating system. In turn, operating system 305 provides a multitasking operating environment for executing one or more software components 317. Processors 302 are coupled to electronic display 306. In this example, user device 300 includes motion sensors 206 and image capture devices 208 coupled to processor 302, but other examples of user devices 300 may include neither or merely either of motion sensors 206 and image capture devices 208. In some examples, processors 302 and memory 304 may be separate, discrete components. In other examples, memory 304 may be on-chip memory collocated with processors 302 within a single integrated circuit. The memory 304, processors 302, operating system 305, and application engine 340 components may collectively represent an example of internal control unit 201 of FIG. 2.

User device 300 may include user input devices, such as a touchscreen or other presence-sensitive screen example of electronic display 203, microphone, controllers, buttons, keyboard, and so forth. Application engine 340 may generate and present a login interface via electronic display 203. A user of user device 300 may use the user interface devices to input, using the login interface, login information for the user. User device 300 may send the login information to console 106 to log the user into the artificial reality system.

Operating system 305 provides an operating environment for executing one or more software components, which include application engine 320. Application engine 320 may be an artificial reality application having one or more processes. Application engine 320 may execute according to a mode of engagement 304 configured for user device 300 for the artificial reality application. The mode of engagement 304 may specify one or more permissible types of interaction for user device 300 within the artificial reality system in which user device 300 is participating. Application engine 320 may send, to console 106 as mapping information using an I/O interface (not shown in FIG. 3) via a network or other communication link, representations of sensor data generated by motion sensors 206 or images generated by image capture devices 208. The artificial reality application may be, e.g., a teleconference application, a gaming application, a navigation application, an educational application, or training or simulation application, for example.

In general, console 106 is a computing system that interfaces with user devices of an artificial reality system. In some examples, console 106 interfaces with the user devices according to respective modes of engagement 334 for the user devices. Modes of engagement 334 stores one or more modes of engagement for one or more user devices interacting with console 106 or otherwise participating an artificial reality system that includes console 106. In some examples, console 106 generates, based at least on mapping information received from user devices, a master 3D map of a physical 3D environment in which the user devices are located.

In some examples, console 106 is a single computing device, such as a workstation, a desktop computer, a laptop. In some examples, at least a portion of console 106, such as processors 352 and/or memory 354, may be distributed across one or more computing devices, a cloud computing system, a data center, or across a network, such as the Internet, another public or private communications network, for instance, broadband, cellular, Wi-Fi, and/or other types of communication networks, for transmitting data between computing systems, servers, and computing devices.

In the example of FIG. 3, console 106 includes one or more processors 312 and memory 314 that provide a computer platform for executing an operating system 316. In turn, operating system 316 provides an operating environment for executing one or more software components 317. Processors 312 are coupled to I/O interface 315, which provides one or more I/O interfaces for communicating with external devices, such as a keyboard, game controllers, display devices, image capture devices, and the like. Moreover, I/O interface 315 may include one or more wired or wireless network interface cards (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read-only memory (ROM), programmable read-only memory (PROM), erasable programmable read-only memory (EPROM), electronically erasable programmable read-only memory (EEPROM), and/or Flash memory.

Software components 317 of console 106 operate to provide an overall artificial reality application. In this example, software components 317 include application engine 320, rendering engine 322, classifier 324, pose tracker 326, mapping engine 328, and configuration interface 332.

In general, application engine 314 includes functionality to provide and present an artificial reality application, e.g., a teleconference application, a gaming application, a navigation application, an educational application, training or simulation applications, and the like. Application engine 314 and application engine 340 may cooperatively provide and present the artificial reality application in some examples.

Application engine 314 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of user device 300.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may be overlaid, at least in part, upon the physical 3D environment in which user device 300 is located. During this process, pose tracker 326 may operate on sensed data received from user device 300, such as movement information and user commands, and, in some examples, data from any external sensors 90 or external camera 102 (as shown in FIGS. 1A, 1B) to capture 3D information within the physical 3D environment, such as motion by user device 300, a user thereof, a controller, and/or feature tracking information with respect to the user thereof. Based on the sensed data, pose tracker 326 determines a current pose for the frame of reference of user device 300 and, in accordance with the current pose, generates the artificial reality content for communication to user device 300 for display to the user via electronic display 203.

In some examples, user devices may be localized to the physical 3D environment based on their configured modes of engagement. That is, in some examples, the modes of engagement determined for each user device specify how the pose of the device is to be determined by pose tracker 326. For example, mode of engagement 304 for user device 300 may denote that user device 302 is to be localized using images generated by image capture devices 208. As another example, mode of engagement 304 may denote that user device 302 is to be localized using tracking information from external cameras. As another example, mode of engagement 304 may denote that user device 302 is to be localized using sensor data, such as GPS device-generated sensor data or accelerometer-generated sensor data. Accordingly, pose tracker 326 may determine the mode of engagement for user device 300 stored to modes of engagement 334 for user device 300 and localize user device 300 with respect to the master 3D map stored to map data 330, as described in further detail below, based on the mode of engagement for user device 300.

In some examples, console 106 further includes a classifier 324 configured to classify user devices to one or more the modes of engagement for the user devices based on classification data, which may comprise data indicating capabilities and/or computing resources of user devices, current environmental or operating conditions experienced by each of the user devices, such as feature tracking quality, feature lighting quality, network performance, computing resource usage, eye tracking quality, environmental brightness, line-of-sight or other visibility conditions affecting image tracking, image texture, rendering quality, network performance or latency, computing resource usage, jitter or any other factors that may impact user device engagement, such as the ability of the system to accurately compute updated pose information a user device.

For example, user device 300 may send classification data specifying types of input/output components associated with the user device that enable different types of interaction of the user device within the artificial reality system. For example, a camera may enable uploading of images for map generation, while a GPS sensor may enable tracking, and an electronic display may enable display of artificial reality content. Classifier 324 may process the classification data to determine, using policies, rules, or one or more reference tables for instance, mode of engagement 304 based on the different types of input/output components for user device 300. Classifier 324 may generate and store data specifying the mode of engagements for user device 300 to a data structure, represented in FIG. 3 as modes of engagement 334. Application engine 320 operates according to modes of engagement 320 and, in some examples, may send an indication of the mode of engagement 304 to user device 300. User device 300 may thereafter operate according to its respective mode as mode of engagement, thereby controlling the user experience in accordance with modes of engagement 304.

In some examples, console 106 further includes a configuration interface 332 and a role repository 344. Configuration interface 332 may generate a login interface for presentation to a user of user device 300 via application engine 340 and electronic display 203. A user of user device 300 uses user input devices to input, using the login interface, login information for the user. User device 300 may send the login information to console 106 to log the user into the artificial reality system. Configuration interface 332 may further receive role data specifying one or more modes of engagement for user profiles, which console 106 stores as role repository 344. Based on the login information for the user, classifier 324 in this example classifies the user device 300 to a mode of engagement 304 based on the login information and the role repository 344. For example, role repository 344 may specify that user "user1" has mode of engagement "spectator". Accordingly, based on login information for user "user1", classifier 324 classifies user device 300 to the "spectator" mode of engagement. Classifier 324 may store the mode of engagement 304 for user device 300 to modes of engagement 334. Application engine 320 may send an indication of the mode of engagement 304 to user device 300. User device 300 may thereafter operate according to mode of engagement 304.

In some examples, console 106 includes a mapping engine 328 configured to generate maps of a physical 3D environment using mapping information received from user devices. Mapping engine 328 may receive the mapping information in the form of images captured by image capture devices 208 at local poses of user device 300 and/or tracking information for user device 300, for example. Mapping engine 328 processes the images to identify map points for determining topographies of the scenes in the images and use the map points to generate map data 330 that is descriptive of an area of the physical 3D environment in which user device 300 is operating. Map data 330 may include at least one master 3D map of the physical 3D environment that represents a current best map, as determined by mapping engine 328 using the mapping information.

Mapping engine 328 may receive images from multiple different user devices operating in different areas of a physical 3D environment and generate different maps for the different areas. The different maps may be disjoint in that the maps do not, in some cases, overlap to describe any of the same areas of the physical 3D environment. However, the different maps may nevertheless be different areas of the master 3D map for the overall physical 3D environment.

Console 106 may receive mapping information from user device 300 and mapping engine 328 may progressively generate a map for an area in which user device 300 is operating over time, as user device 300 moves about the area. Pose tracker 326 may localize user device 300, using any of the aforementioned methods, to the map for the area. Pose tracker 326 may also attempt to localize user device 300 to other maps generated using mapping information from other user devices. At some point, pose tracker 326 may compute the local pose for user device 300 to be in an area of the physical 3D environment that is described by a map generated using mapping information received from a different user device. Using mapping information received from user device 300 located and oriented at the computed local pose, mapping engine 328 may join the map for the area generated using mapping information for user device 300 to the map for the area generated using mapping information for the different user device to close the loop and generate a combined map for the master 3D map. Mapping engine 328 stores that maps as map data 330.

As described above, user devices may be localized to the physical 3D environment based on their configured modes of engagement. Mode of engagement 304 may specify that user device 300 is to be localized using images captured at local poses of user device 300. Consequently, in response to receiving images from user device 300, pose tracker 326 may query modes of engagement 334 to obtain the mode of engagement 304 for user device 300 and compute the local pose for user device 300 based on the images and the master 3D map in map data 330. For example, mapping engine 328 may identify features within the images to determine map points (position data) and compare the map points to master map points of the master 3D map. By matching map points for features extracted from the images to master map points, mapping engine 328 can determine an approximate location and orientation for user device 300 in the physical 3D environment. Pose tracker 326 may query user device 300 for the images. In this way, a more limited class of devices such as smart phones and tablet computers may nevertheless engage with the artificial reality system despite having no or limited tracking ability.

Mode of engagement 304 may, alternatively, specify that user device 300 is to be localized other than by using images captured at local poses of user device 300. For example, in response to receiving tracking information from user device 300, pose tracker 326 may query modes of engagement 334 to obtain the mode of engagement 304 for user device 300 and compute the local pose for user device 300 using the tracking information. Pose tracker 326 may query user device 300 for the tracking information.

Mapping engine 328 may use mapping information received from user device 300 to update the master 3D map in map data 330. Mapping engine 328 may, in some examples, determine whether the mapping information is preferable to previous mapping information used to generate the master 3D map. For example, mapping engine 328 may determine the mapping information is more recent in time, of higher resolution or otherwise better quality, indicates more or different types of objects, has been generated by a user device having higher resolution localization abilities (e.g., better inertial measurement unit or navigation system) or better optics or greater processing power, or is otherwise preferable. If preferable, mapping engine 328 generates an updated master 3D map from the mapping information received from user device 300. Mapping engine 328 in this way progressively improves the master 3D map.

In some examples, mapping engine 328 may generate and store health data in association with different map data of the master 3D map. For example, some map data may be stale in that the mapping information used to generate the map data was received over an amount of time ago, or the map data may be of poor quality in that the images used to the generate the map data were poor quality (e.g., poor resolution, poor lighting, etc.). These characteristics of the map data may be associated with relatively poor health. Contrariwise, high quality mapping information would be associated with relatively good health. Health values for map data may be indicated using a score, a descriptor (e.g., "good", "ok", "poor"), a date generated, or other indicator. In some cases, mapping engine 328 may only update map data of the master 3D map for an area if the health for the map data satisfies a threshold health value (e.g., is below a certain score). If the threshold health value is satisfied, mapping engine 328 generates an updated area for the area of the master 3D map using the mapping information received from user device 300 operating in the area. Otherwise, mapping engine 328 discards the mapping information.

In some examples, map data 330 includes different master 3D maps for different areas of a physical 3D environment. Pose tracker 326 may localize user device 300 to a location in one of the areas using images received from user device 300. In response, application engine 320 may select the master 3D map for the area within which pose tracker 326 localized user device 300 and send the master 3D map to user device 300 for use in the artificial reality application. Consequently, user device 300 may generate and render artificial reality content using the appropriate master 3D map for the area in which user device 300 is located.

In some examples, map data 330 includes different master 3D maps for the same area of a physical 3D environment, the different master 3D maps representing different states of the physical environment. For example, a first master 3D map may describe an area at a first time e.g., August 2015, while a second master 3D map may describe the area at a second time, e.g., October 2016. Application engine 320 may determine to use the first master 3D map responsive to a request from the user or responsive to a trigger within an artificial reality application, for instance. The mapping engine 328 may indicate in map data 330 that the first master 3D map is the master 3D map that is to be used for rendering artificial reality content for an artificial reality application. In this way, an artificial reality system including console 106 can render artificial reality content using historical map data describing a physical 3D environment as it appeared in earlier times. This technique may be advantageous for education-related artificial reality applications, for instance.

In some examples, some or all of the functionality attributed to pose tracker 326, rendering engine 322, configuration interface 332, classifier 324, and application engine 320 may be performed by user device 300.

Figure 4:
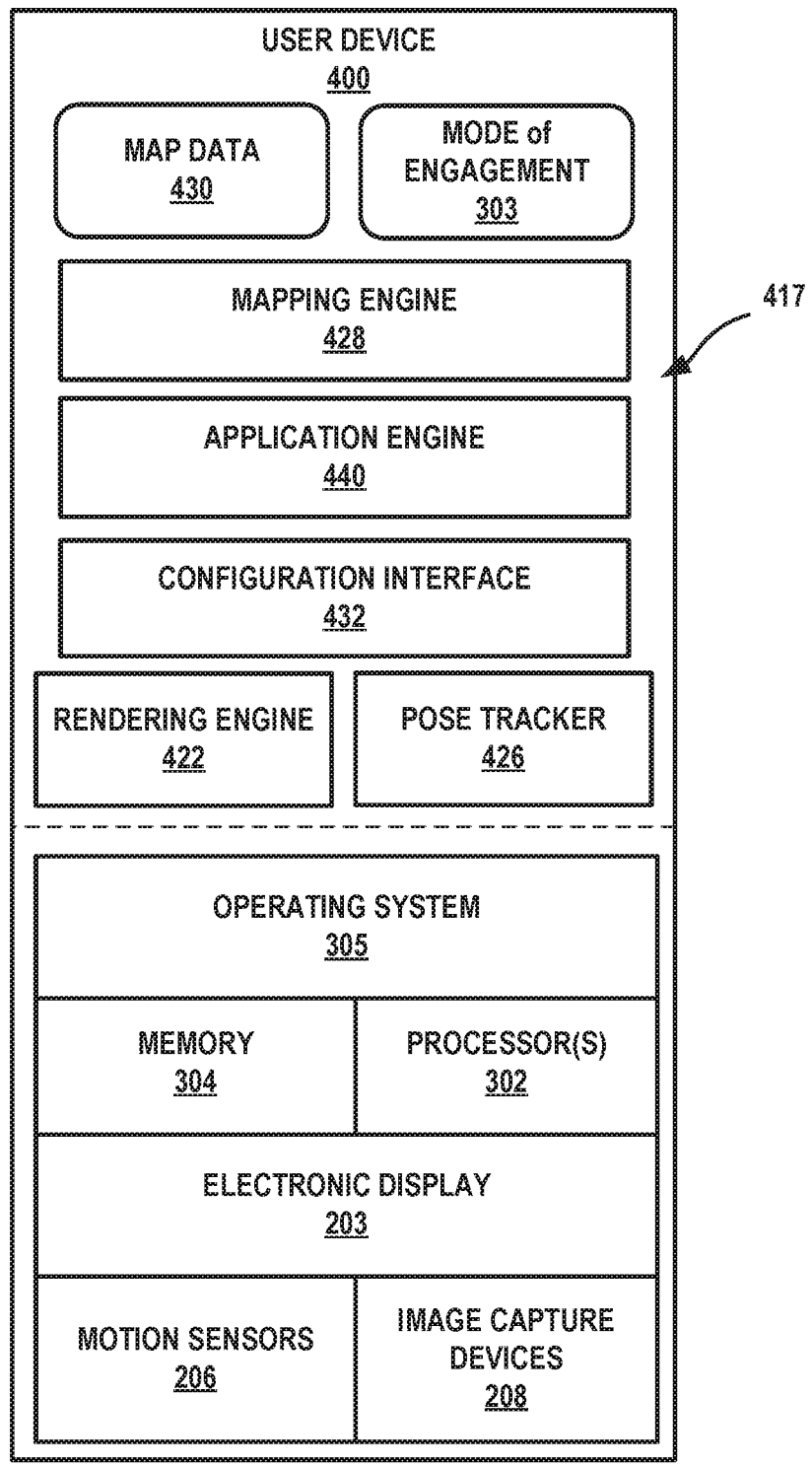
FIG. 4 is a block diagram depicting an example of a user device for an artificial reality system, in accordance with techniques of this disclosure.

FIG. 4 is a block diagram depicting an example of a user device for an artificial reality system, in accordance with techniques of this disclosure. User device 400 operates as a stand-alone device, i.e., is not tethered to a console, and may represent an instance of any of the aforementioned user devices. User device 400 may represent an HMD or tablet computer, for instance. In this example, similar to FIG. 3, user device 400 includes one or more processors 302 and memory 304 that, in some examples, provide a computer platform for executing an operation system 305, which may be an embedded, real-time multitasking operating system. In turn, operating system 305 provides an operating environment for executing one or more software components 417. Moreover, processor(s) 302 are coupled to electronic display 203, motion sensors 206, and image capture devices 208.

In the example of FIG. 4, software components 417 operate to provide an overall artificial reality application. In this example, software components 417 include application engine 440, rendering engine 422, pose tracker 426, mapping engine 428, and configuration interface 432. In various examples, software components 417 operate similar to the counterpart components of console 106 of FIG. 3 (e.g., application engine 320, rendering engine 322, pose tracker 326, and mapping engine 328, and configuration interface 332).

The software components 417 may operate according to mode of engagement 303 for user device 400. User device 400 may localize the user device 400 using a method specified by the mode of engagement 303. User device 400 may generate map data 430, in some cases only if this type of interaction within the artificial reality system is specified by mode of engagement 303. User device 400 may send the map data 430 to other user devices and receive map data from other user devices to cooperatively generate a master 3D map for the physical 3D environment, in some cases only if this type of interaction within the artificial reality system is specified by mode of engagement 303. User device 400 may generate artificial reality content for display by electronic display 203, in some cases only if this type of interaction within the artificial reality system is specified by mode of engagement 303. User device 400 may send event data to a console or other user device within the artificial reality system, in some cases only if this type of interaction within the artificial reality system is specified by mode of engagement 303. Event data may include indications of user input, indications of a status or local pose of the user device 400, indications of operations or activities by the user device 400, or other event data that may affect a state of the artificial reality application, whether distributed among multiple user devices or centralized in user device 400.

Figure 5A:
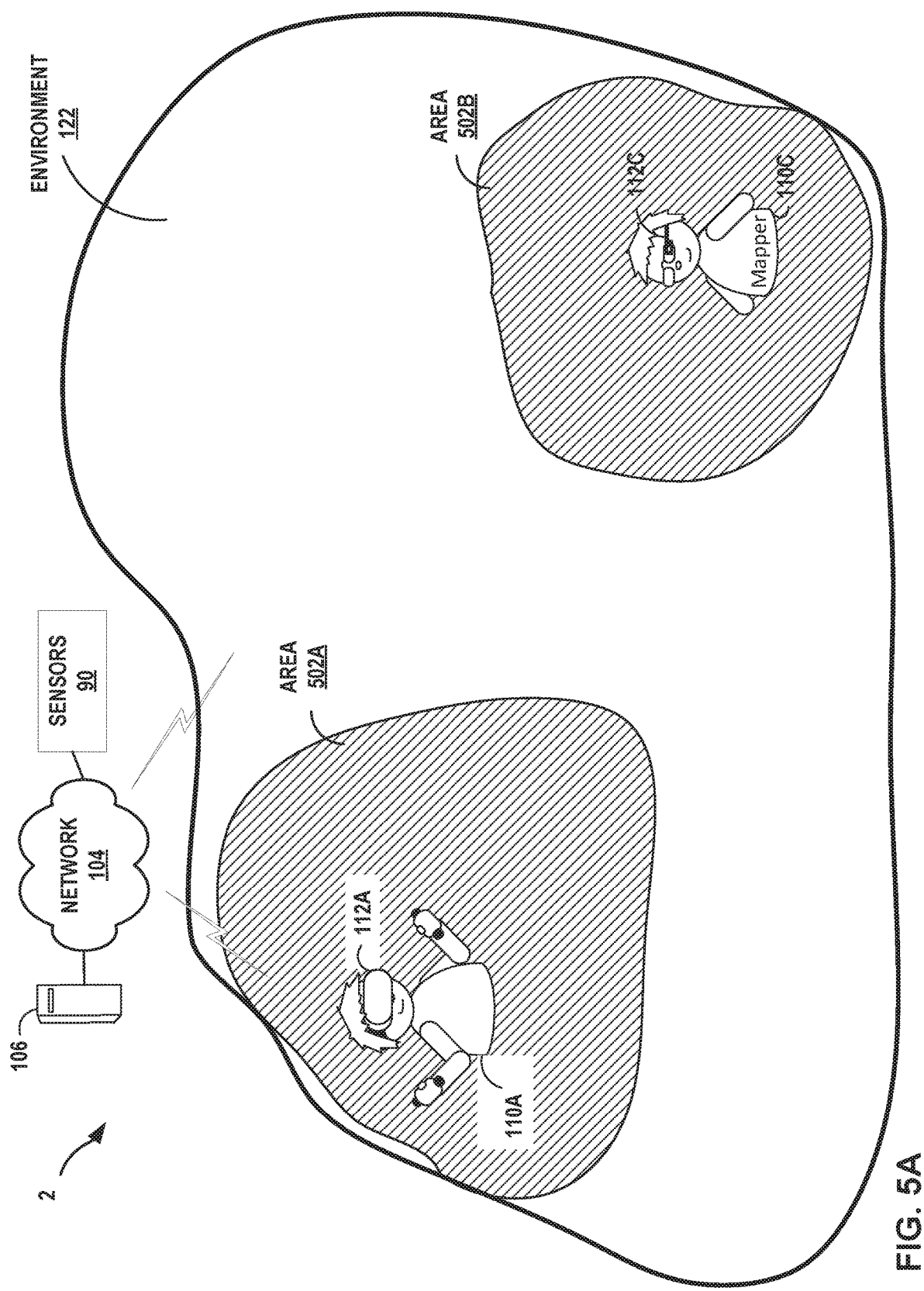
FIGS. 5A-5B are block diagrams depicting an artificial reality system in which multiple user devices contribute mapping information for collaboratively generating a master 3D map of a physical environment, according to techniques of this disclosure.
Figure 5B:
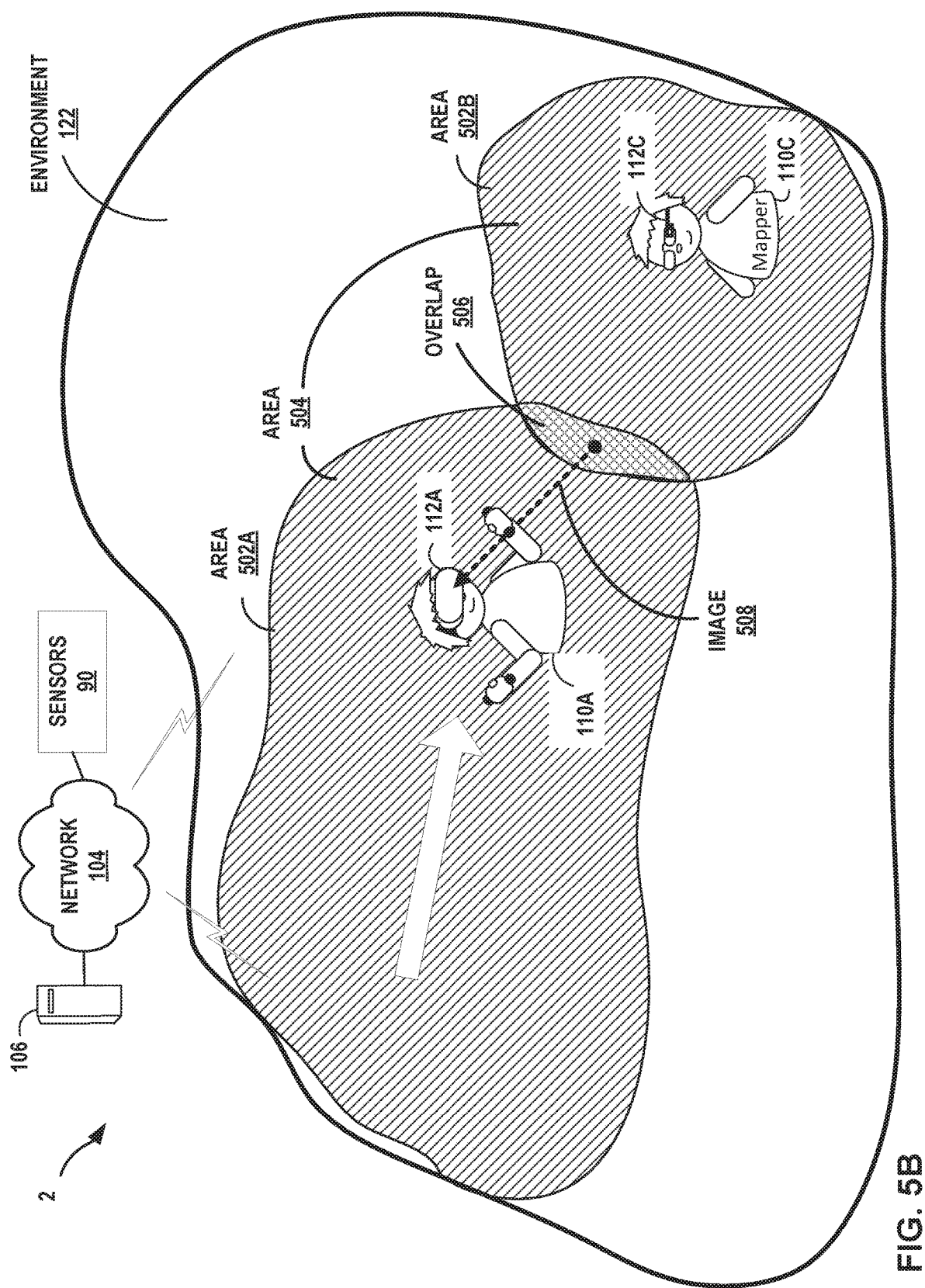

FIGS. 5A-5B are block diagrams depicting an artificial reality system in which multiple user devices, potentially having different modes of engagement, contribute mapping information for collaboratively generating a master 3D map of a physical environment, according to techniques of this disclosure. Physical 3D environment 122 includes areas 502A-502B. User 110A associated with HMD 112A contributes mapping information for area 502A and user 110C associated with HMD 112C, operating as a mapper, contributes mapping information for area 502B. Console 106 uses the mapping information from HMD 112A to generate a map of area 502A and uses the mapping information from HMD 112C to generate a map of area 502B. The maps of areas 502A-502B are different areas of a master 3D map for environment 122. However, each HMD 112A, 112C may be provided with a separate map for the area 502A, 502B in which the HMD is operating, for use in the artificial reality application. HMDs 112 are examples of user devices.

As depicted in FIG. 5B, user 110A and HMD 112A move to area 502B such that the area 502A being mapped by HMD 112A expands to overlap with area 502B being mapped, or previously mapped, by HMD 112C, which represents a user device having a 'mapper'. HMD 112A generates image 508 of the overlap area 506 and sends the image 508 to console 106 to contribute the mapping information and/or to localize HMD 112A within environment 122. Console 106 attempts, using image 508, to localize HMD 112A to the map for area 502B and determines user device 112A is located in area 502B. For instance, console 106 may determine image 508 depicts a portion of area 502B. Console 106 therefore combines the map for area 502A and the map for 502B to close the loop and generate a combined map for area 504, which encompasses areas 502A-502B. Console 106 stores the combined map as a map of the master 3D map for environment 122 and provides the combined map to HMD 112C for use with the artificial reality application. Consequently, HMD 112C may expand the field of vision for the artificial reality content generated and displayed to user 112C. Further, console 106 may subsequently readily localize HMD 112C into area 502A, having already generated the map data for area 502A using mapping information contributed by HMD 112A.

Figure 6:
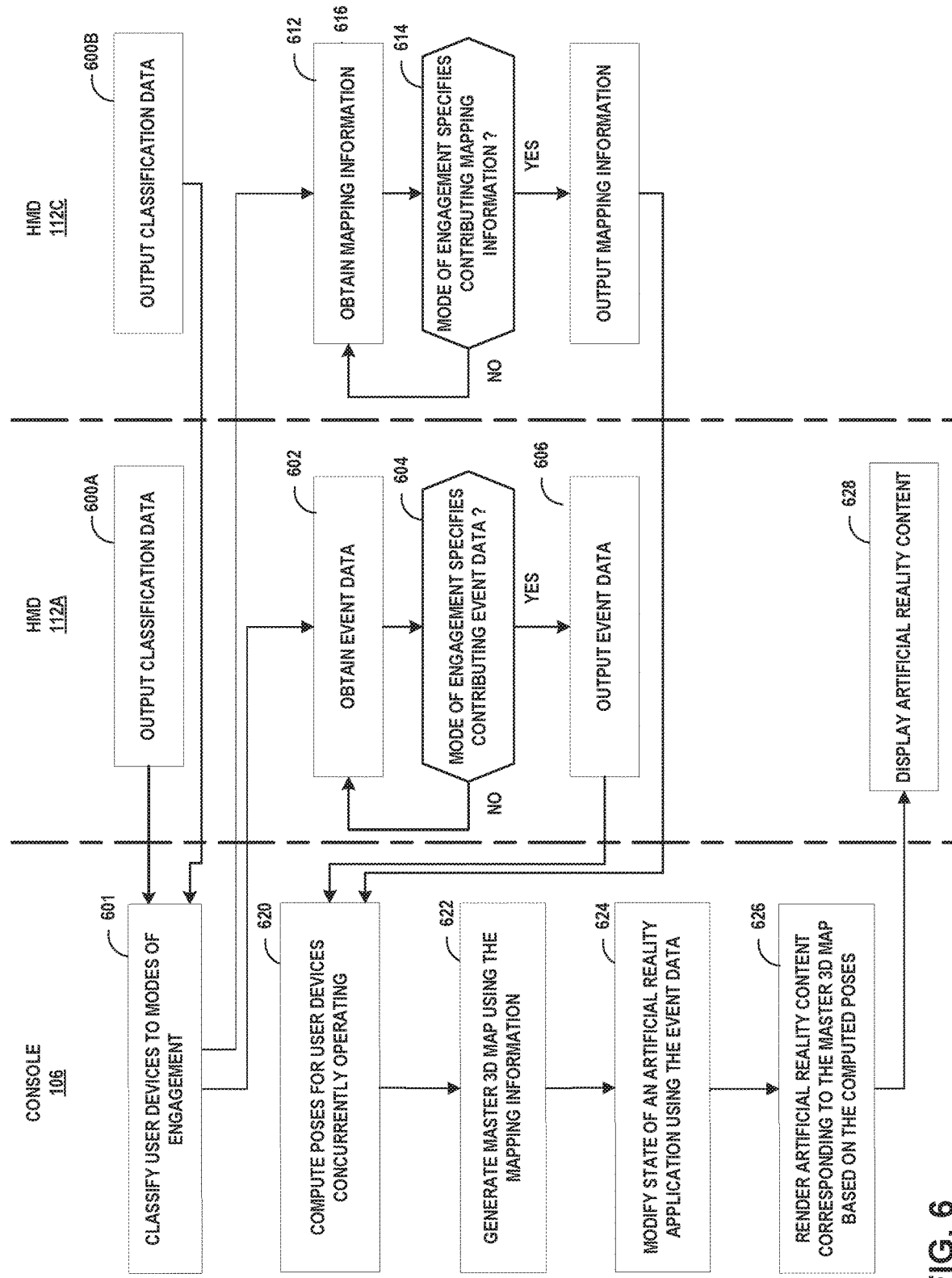
FIG. 6 is a flowchart illustrating an example operation for an artificial reality system in which multiple user devices operate according to different modes of engagement within the artificial reality system, in accordance with techniques of this disclosure.

FIG. 6 is a flowchart illustrating an example operation for an artificial reality system in which multiple user devices operate according to different modes of engagement within the artificial reality system, in accordance with techniques of this disclosure. Each of HMD 112A, 112C is an example of user device 300 of FIG. 3, and the operation is described with respect to respective sets of components of user device 300 for the HMDs 112A, 112C.

In some examples, HMD 112A outputs its classification data to console 106 (600A) and HMD 112B outputs its classification data to console 106 (600B). Classification data may include user information such as login information, operational characteristics, device characteristics such as available components, or other classification data. Console 106 processes the respective classification data for the HMD 112A and 112B to respective modes of engagement 303 for HMD 112A and 112B (601). Console 106 may then send the mode of engagement 303 for HMD 112A to HMD 112A and send the mode of engagement 303 for HMD 112B to HMD 112B to configure the modes of engagement for these user devices.

Application engine 340 of HMD 112A obtains event data for an artificial reality application (602). If the mode of engagement 303 for HMD 112A specifies types of interaction within the artificial reality system that includes uploading event data (YES branch of 604), HMD 112A outputs the event data to console 106 (606).

At least partially concurrently with the operations of HMD 112A, application engine 340 of HMD 112C obtains mapping information for the artificial reality application (612). If the mode of engagement 303 for HMD 112C specifies types of interaction within the artificial reality system that includes uploading mapping information (YES branch of 614), HMD 112C outputs the mapping information to console 106 (616).

Console 106 receives the event data from HMD 112A and the mapping information from HMD 112C. Pose tracker 326 computes poses for each of HMD 112A and 112C, in some cases based on the respective modes of engagement 303 for HMD 112A and 112C that determine the method of computing poses for the HMD 112A and 112C (622). Mapping engine 328 of console 106 generates a master 3D map for the physical environment 122 using the mapping information and stores the master 3D map to map data 330 (622). Application engine 320 modifies a state of the artificial reality application using the event data from HMD 112C (624). Application engine 320 may use the computed pose for HMD 112C to determine the how the state of the artificial reality application is to be modified using the event data from HMD 112C.

Rendering engine 322 renders artificial reality content, corresponding to the master 3D map stored to map data 330, based on the computed poses for the HMDs 112A and 112C (626). Rendering engine 322 outputs the artificial reality content to HMD 112A for display by the electronic display 203 of HMD 112A (628). In some examples, rendering engine 322 may output the artificial reality content to HMD 112A only if mode of engagement 303 for HMD 112A specifies a type of interaction that includes receiving and displaying rendered content for the artificial reality application.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
a plurality of user devices concurrently operating within a physical three-dimensional (3D) environment, wherein each user device of the user devices operates according to one or more of a plurality of modes of engagement within the artificial reality system, and wherein one or more of the user devices contribute mapping information for the physical 3D environment;
a mapping engine configured to generate, using the mapping information, a master three-dimensional (3D) map of the physical 3D environment;
one or more pose trackers configured to compute, in response to determining a mode of engagement for a particular user device of the user devices specifies pose computation for the particular user device using images captured at local poses of the particular user device, a computed local pose for the particular user device based at least on an image captured at a local pose for the particular user device and the master 3D map; and
one or more rendering engines configured to render, based at least on the computed local pose for the particular user device, artificial reality content corresponding to the master 3D map, the artificial reality content for display by one or more of the user devices.

2. The artificial reality system of claim 1,
wherein each mode of the plurality of modes of engagement specifies one or more permissible types of interaction for a user device of the user devices operating according to the mode, and
wherein the types of interaction comprise one or more of: receiving and displaying rendered content for the artificial reality application, pose computation for the user device using tracking information, pose computation for the user device using images captured at local poses of the user device, contributing mapping information to the artificial reality system, contributing event data for the artificial reality application, or generating and displaying rendered content for the artificial reality application using the master 3D map.

3. The artificial reality system of claim 2, further comprising:
a classifier configured to classify, for each user device of the user devices, based on input devices and output devices associated with the user device that enable any of the types of interaction by the user device, the user device to one of the modes of engagement.

4. The artificial reality system of claim 1, further comprising:
a role repository specifying a plurality of users and, for each user, role data that specifies one or more modes of engagement;
a configuration interface configured to receive login information for a user of a user device of the user devices; and
a classifier configured to classify, based at least on the login information for the user of the user device, the user device to the one or more modes of engagement specified by the role data for the user.

5. The artificial reality system of claim 1,
wherein the mapping information comprises first mapping information captured at local poses of the particular user device,
wherein the mapping information comprises second mapping information captured at local poses of a second user device of the user devices,
wherein the mapping engine is configured to generate a map of a first area of the physical 3D environment from the first mapping information and to generate a map of a second area of the physical 3D environment from the second mapping information, and
wherein the map of the first area and the map of the second area are different areas of the master 3D map.

6. The artificial reality system of claim 5,
wherein the mapping engine is configured to determine, based at least on the first mapping information, that the map of the first area of the physical 3D environment and the map of the second area of the physical 3D environment overlap, and
wherein the mapping engine is configured to combine, in response to the determination, the map of the first area of the physical 3D environment and the map of the second area of the physical 3D environment overlap to generate a combined map for the master 3D map.

7. The artificial reality system of claim 1,
wherein the mapping information comprises first images captured at local poses of the particular user device.

8. The artificial reality system of claim 7,
wherein the mapping engine is configured to generate an updated master 3D map of the physical 3D environment based at least on the first images and the computed local poses of the particular user device.

9. The artificial reality system of claim 8, wherein to generate the updated master 3D map of the physical 3D environment, the mapping engine is configured to generate, in response to determining the images are preferable to previous mapping information used to generate the master 3D map, the updated master 3D map of the physical 3D environment based at least on the images and the computed local poses of the particular user device.

10. The artificial reality system of claim 1,
wherein the mapping information is captured at local poses of the particular user device,
wherein the mapping information comprises tracking information for the particular user device,
wherein the one or more pose trackers are configured to compute, in response to determining a mode of engagement for the particular user device specifies pose computation for the particular user device using tracking information, the local poses of the particular user device based at least on the tracking information for the particular user device, and
wherein the mapping engine is configured to generate an updated master 3D map of the physical 3D environment based at least on the mapping information and the computed local poses of the particular user device.

11. The artificial reality system of claim 1,
wherein the mapping engine is configured to compute respective health values for different areas of the master 3D map,
wherein the health value for an area of the master 3D map indicates a quality of mapping information used to generate the area of the master 3D map.

12. The artificial reality system of claim 1,
wherein the mapping engine is configured to generate, only in response to determining a health value for an area of master 3D map satisfies a threshold health value, an updated area for the area of the master 3D map using additional mapping information contributed by any of the user devices.

13. The artificial reality system of claim 1,
wherein one of the user devices comprises a head-mounted display (HMD),
wherein the HMD comprises one of the pose trackers configured to compute the pose for the HMD within the master 3D map, and
wherein the HMD comprises one of the rendering engines configured to generate the artificial reality content for display by the HMD.

14. The artificial reality system of claim 1, further comprising:
one or more console devices, wherein the one or more console devices comprise the mapping engine, at least one of the pose trackers, and at least one of the rendering engines.

15. An artificial reality system comprising:
a plurality of user devices concurrently operating within a physical three-dimensional (3D) environment, wherein one or more of the user devices contribute mapping information for the physical 3D environment;
one or more pose trackers configured to compute respective poses for each of the user devices;
a mapping engine configured to generate, using the mapping information, a first master three-dimensional (3D) map of a first area of the physical 3D environment and a second master 3D map of a second area of the physical 3D environment, and
wherein the one or more pose trackers are configured to determine, based at least on mapping information captured at a local pose for a user device of the user devices, the user device is located within the first area of the physical 3D environment and is not located in the second area of the physical 3D environment,
wherein the one or more pose trackers are configured to select, in response to the determination, the first master 3D map as the master 3D map of the physical 3D environment for the user device; and
one or more rendering engines configured to render, based at least on one or more of the computed poses, artificial reality content corresponding to the master 3D map, the artificial reality content for display by one or more of the user devices.

16. An artificial reality system comprising:
a plurality of user devices concurrently operating within a physical three-dimensional (3D) environment, wherein one or more of the user devices contribute mapping information for the physical 3D environment;
one or more pose trackers configured to compute respective poses for each of the user devices;
a mapping engine configured to generate, using the mapping information, a master three-dimensional (3D) map of the physical 3D environment,
wherein the mapping engine is configured to store a first master 3D map of the physical 3D environment representing a state of the physical 3D environment at a first time,
wherein the mapping engine is configured to store a second master 3D map of the physical 3D environment representing the state of the physical 3D environment at a second time, the second time different than the first time, and
wherein the mapping engine is configured to receive an indication to select the first master 3D map of the physical 3D environment as the master 3D map of the physical 3D environment for a user device of the plurality of user devices; and
one or more rendering engines configured to render, based at least on the computed pose for the user device, artificial reality content corresponding to the master 3D map, the artificial reality content for display by the user device.

17. A method comprising:
obtaining, by an artificial reality system, mapping information for a physical three-dimensional (3D) environment generated by one or more of a plurality of user devices concurrently operating within the physical 3D environment, wherein each of the user devices operates according to one or more of a plurality of modes of engagement within the artificial reality system;
generating, using the mapping information, a master three-dimensional (3D) map of the physical 3D environment;
computing, in response to determining a mode of engagement for a particular user device of the user devices specifies pose computation for the particular user device using images captured at local poses of the particular user device, a computed local pose for the particular user device based at least on an image captured at a local pose for the particular user device and the master 3D map; and
rendering, based at least on the computed local pose for the particular user device, artificial reality content corresponding to the master 3D map, the artificial reality content for display by one or more of the user devices.

18. The method of claim 17,
wherein each mode of the modes of engagement specifies one or more permissible types of interaction for a user device of the user devices operating according to the mode, and
wherein the types of interaction comprise one or more of: receiving and displaying rendered content for the artificial reality application, pose computation for the user device using tracking information, pose computation for the user device using images captured at local poses of the user device, contributing mapping information to the artificial reality system, contributing event data for the artificial reality application, or generating and displaying rendered content for the artificial reality application using the master 3D map.

19. A non-transitory computer-readable medium comprising instructions for causing one or more processors of an artificial reality system to perform operations comprising:
obtaining mapping information for a physical three-dimensional (3D) environment generated by one or more of a plurality of user devices concurrently operating within the physical 3D environment, wherein each of the user devices operates according to one or more of a plurality of modes of engagement within the artificial reality system;
generating, using the mapping information, a master three-dimensional (3D) map of the physical 3D environment;
computing, in response to determining a mode of engagement for a particular user device of the user devices specifies pose computation for the particular user device using images captured at local poses of the particular user device, a computed local pose for the particular user device based at least on an image captured at a local pose for the particular user device and the master 3D map; and rendering, based at least on the computed local pose for the particular user device, artificial reality content corresponding to the master 3D map, the artificial reality content for display by one or more of the user devices.

\* \* \* \* \*